(12) United States Patent
Yin et al.

(10) Patent No.: US 12,472,709 B2
(45) Date of Patent: Nov. 18, 2025

(54) LENS CLAMPING DEVICE

(71) Applicants: ACCELINK TECHNOLOGIES CO., LTD., Wuhan (CN); CHINA INFORMATION COMMUNICATION TECHNOLOGIES GROUP CORPORATION, Wuhan (CN)

(72) Inventors: Hualin Yin, Wuhan (CN); Shijie Chu, Wuhan (CN); Shuwei Tan, Wuhan (CN); Yuan Zhou, Wuhan (CN)

(73) Assignees: Accelink Technologies Co., Ltd., Wuhan (CN); China Information Communication Technologies Group Corporation, Wuhan (CN)

( * ) Notice: Subject to any disclaimer, the term of this patent is extended or adjusted under 35 U.S.C. 154(b) by 410 days.

(21) Appl. No.: 18/001,345

(22) PCT Filed: Dec. 22, 2020

(86) PCT No.: PCT/CN2020/138410
§ 371 (c)(1),
(2) Date: Dec. 9, 2022

(87) PCT Pub. No.: WO2021/258687
PCT Pub. Date: Dec. 30, 2021

(65) Prior Publication Data
US 2023/0271391 A1  Aug. 31, 2023

(30) Foreign Application Priority Data
Jun. 23, 2020  (CN) .................. 202010581002.X

(51) Int. Cl.
*B29D 11/00* (2006.01)
*G02B 7/02* (2021.01)

(52) U.S. Cl.
CPC .... *B29D 11/0024* (2013.01); *B29D 11/00951* (2013.01); *G02B 7/02* (2013.01)

(58) Field of Classification Search
CPC .......... B29D 11/00951; B29D 11/0023; B29D 11/0024; G02B 7/02
See application file for complete search history.

(56) References Cited

U.S. PATENT DOCUMENTS 5,505,222 A   4/1996   Lin et al.

FOREIGN PATENT DOCUMENTS

| CN | 201039965 Y | 3/2008 |
| CN | 102981235 A | 3/2013 |

(Continued)

OTHER PUBLICATIONS

International Search Report issued in International Application No. PCT/CN2020/138410, mailed on Mar. 30, 2021.

(Continued)

*Primary Examiner* — Jia X Pan
(74) *Attorney, Agent, or Firm* — Knobbe Martens Olson & Bear LLP

(57) ABSTRACT

A lens clamping device, relating to the field of optical communication devices, comprises: a base; a sliding mechanism slidably connected with the base and movable relative to the base along a first direction; a transmission mechanism connected with the sliding mechanism and having a first and a second clamping member capable of relatively away from and close to each other along a second direction perpendicular to the first direction; and a suction nozzle fixedly connected to one end of the sliding mechanism along the first direction and used for sucking a lens; wherein the suction nozzle is between the first and second clamping member which are relatively close to each other to limit the displacement of the lens in the second direction. The lens (Continued)

clamping device improves the reliability of picking up the lens by means of limit in two directions.

11 Claims, 7 Drawing Sheets

(56)  References Cited

FOREIGN PATENT DOCUMENTS

| CN | 104535052 | A |   | 4/2015 |   |
|---|---|---|---|---|---|
| CN | 204585236 | U |   | 8/2015 |   |
| CN | 106125250 | A |   | 11/2016 |   |
| CN | 108152990 | A |   | 6/2018 |   |
| CN | 207457583 | U | * | 6/2018 |   |
| CN | 108381580 | A |   | 8/2018 |   |
| CN | 207957014 | U |   | 10/2018 |   |
| CN | 108732780 | A |   | 11/2018 |   |
| CN | 208270831 | U |   | 12/2018 |   |
| CN | 208840816 | U |   | 5/2019 |   |
| CN | 209599323 | U |   | 11/2019 |   |
| CN | 110657146 | A | * | 1/2020 | ............ F16B 11/006 |
| CN | 210084401 | U |   | 2/2020 |   |
| CN | 110989124 | A |   | 4/2020 |   |
| CN | 210452770 | U |   | 5/2020 |   |
| CN | 111736290 | A |   | 10/2020 |   |
| DE | 29609283 | U1 |   | 9/1996 |   |
| JP | 2001225265 | A |   | 8/2001 |   |
| JP | 2008264973 | A |   | 11/2008 |   |

OTHER PUBLICATIONS

Lamontagne et al., "Disruptive advancement in precision lens mounting", Proc. of SPIE, vol. 9582, 2015, in 13 pages.

Search Report issued in Chinese Application No. 202010581002.X, dated Mar. 10, 2021.

Supplementary Report issued in Chinese Application No. 202010581002.X, dated Aug. 23, 2021.

Supplementary Report issued in Chinese Application No. 202010581002.X, dated Nov. 19, 2021.

Xin, Z., "An Application Improvement of Typical Material-Taking Mechanism", Internal Combustion & Engine Parts, Jan. 15, 2019, pp. 193-194.

Office Action issued in Japanese Patent Application No. 2022-574442, dated Mar. 18, 2025.

* cited by examiner

LENS CLAMPING DEVICE

CROSS-REFERENCE TO RELATED APPLICATION(S)

The present disclosure claims the priority of a Chinese patent application No. 202010581002.X filed on Jun. 23, 2020, the disclosure of which is hereby incorporated by reference herein in its entirety.

TECHNICAL FIELD OF THE DISCLOSURE

The present disclosure relates to the technical field of optical communication devices, and in particular, to a lens clamping device.

BACKGROUND

The lens clamping device is an optical device that may pick up lens. The related lens clamping device comprises a bracket and a pickup structure connected with the bracket, and the bracket may move within a pickup area so as to drive the pickup structure to close to the lens and pick up the lens.

The related pickup structure includes an adsorption type pickup structure and a clamping type pickup structure. The related adsorption type pickup structure comprises a vacuum suction nozzle which realizes the suction for a lens by means of the adsorption force of the suction nozzle. However, the sucked lens may deviate during a continuous high-speed action, resulting in insufficient reliability of pickup.

The related clamping type pickup structure comprises two clamping jaws which are provided oppositely. On one hand, in order to ensure the reliability of clamping, the structural design is complex, and the smaller the lens is, the higher the processing precision requirement for the clamping jaw is. On the other hand, in the process of clamping or releasing the lens, one of the clamping jaws is fixed for playing a positioning role, and the other clamping jaw controls the clamping or releasing, however, the clamping and releasing action of the two clamping jaws will cause the acting force received by the lens to be uneven and deviated, thus affecting the curing effect of glue on the lens and reducing the yield of the lens.

SUMMARY

Embodiments of the present disclosure provide a lens clamping device.

The embodiments of the present disclosure provide a lens clamping device, comprising: a base; a sliding mechanism, which is slidably connected with the base, and is movable relative to the base along a first direction; a transmission mechanism, which is connected with the sliding mechanism, and includes a first clamping member and a second clamping member which are movable relatively far away from and close to each other along a second direction, wherein the second direction is perpendicular to the first direction; and a suction nozzle, which is fixedly connected to one end of the sliding mechanism along the first direction and is used for sucking the lens; wherein the suction nozzle is located between the first clamping member and the second clamping member, and the first clamping member and the second clamping member relatively close to each other so as to limit a displacement of the lens in the second direction.

Further, the transmission mechanism further comprises: a first moving member, which is connected with the sliding mechanism and is located on one side of the sliding mechanism along the second direction, wherein the first moving member is movable relative to the sliding mechanism and is adjacent to one end of the first clamping member; a second moving member, which is connected with the sliding mechanism and is located on the other side of the sliding mechanism along the second direction opposite to the one side, wherein the second moving member is movable relative to the sliding mechanism and is adjacent to one end of the second clamping member; a first return member, which is provided between the other end of the first clamping member and the sliding mechanism; a second return member, which is provided at intervals with the first return member along the second direction, and is located between the other end of the second clamping member and the sliding mechanism; wherein the first moving member and the second moving member move along opposite directions at the same rate to push the first clamping member and the second clamping member to approach each other; and the first return member and the second return member respectively generate a return force that makes the first clamping member and the second clamping member be relatively far away from each other with the approaching each other of the first clamping member and the second clamping member.

Further, the first moving member is a first connecting rod rotatably connected with the sliding mechanism, and the second moving member is a second connecting rod rotatably connected to the sliding mechanism.

Further, the lens clamping device further comprises an elastic element, which is provided between the base and the other end of the sliding mechanism opposite to the one end, and is connected with both the base and the sliding mechanism.

Further, the lens clamping device further comprises a locking rod which is connected with the base and is located at the other end of the sliding mechanism, wherein the locking rod is movable in a direction approaching the suction nozzle along the first direction, so as to limit a movement of the sliding mechanism relative to the base.

Further, the base is provided with a sliding groove extending along the first direction, the sliding mechanism includes a first sliding block and a second sliding block fixedly connected with the first sliding block; the first sliding block is slidable along the sliding groove in the first direction; the locking rod is connected with one end of the sliding groove far away from the suction nozzle, wherein the locking rod is movable in the direction approaching the suction nozzle along the first direction, and brings in contact with one end of the second sliding block, and then pushes the second sliding block to move in the direction approaching the suction nozzle along the first direction, so that one end of the first sliding block far away from the locking rod abuts against one end of the sliding groove close to the suction nozzle.

Further, both the first return member and the second return member are compression springs, and the other end of the sliding mechanism close to the first clamping member is provided with a first protrusion, and the other end of the sliding mechanism close to the second clamping member is provided with a second protrusion, wherein the first return member is sleeved on the first protrusion, and the second return member is sleeved on the second protrusion; wherein the first return member and the second return member are always in a compressed state.

Further, the sliding mechanism further comprises a first limit member and a second limit member, both of which are fixedly connected with the second sliding block and are respectively located on one side of the first moving member and the second moving member both far away from the second sliding block, so as to limit the movement of the first moving member and the second moving member.

Further, the lens clamping device further comprises a driving device, wherein the driving device includes a first driving device provided adjacent to the first connecting rod to drive the first connecting rod to rotate, and the driving device further includes a second driving device adjacent to the second connecting rod to drive the second connecting rod to rotate.

Further, the first driving device includes a first driving rod adjacent to one end of the first connecting rod, wherein the first driving rod is movable in a direction close to the first connecting rod along the first direction to push the first connecting rod to rotate, and is movable in a direction far away from the first connecting rod along the first direction to detach from the first connecting rod; the second driving device includes a second driving rod adjacent to one end of the second connecting rod, wherein the second driving rod is movable in a direction close to the second connecting rod along the first direction to push the second connecting rod to rotate, and is movable in a direction far away from the second connecting rod along the first direction to detach from the second connecting rod; a driving source, which is connected with the first driving rod and the second driving rod to drive the first driving rod and the second driving rod to reciprocate along the first direction.

Further, the suction nozzle is located between the first clamping member and the second clamping member, both of which are movable relatively close to each other to clamp the lens, and are movable relatively far away from each other to release the lens.

The present disclosure provides a lens clamping device which comprises a base, a sliding mechanism, a transmission mechanism and a suction nozzle, wherein the transmission mechanism includes a first clamping member and a second clamping member capable of being relatively far away from and close to each other along a second direction, between of which the suction nozzle is located, and the first clamping member and the second clamping member are relatively close to each other so as to limit a displacement of the lens in the second direction. The lens clamping device of the present disclosure limits the movement of the lens relative to the suction nozzle in the first direction in a manner of sucking the lens by the suction nozzle, and the first clamping member and the second clamping member limit the movement of the lens relative to the first clamping member and the second clamping member in the second direction in a manner of clamping the lens. The reliability of picking up the lens by the lens clamping device is improved by means of the limitation in two directions.

BRIEF DESCRIPTION OF THE DRAWINGS

In order to more clearly explain the embodiments of the present disclosure or the technical solutions in the prior art, the drawings required in the embodiments of the present disclosure or the description of the prior art are briefly introduced in the followings.

LIST OF REFERENCE SIGNS

Figure 1:
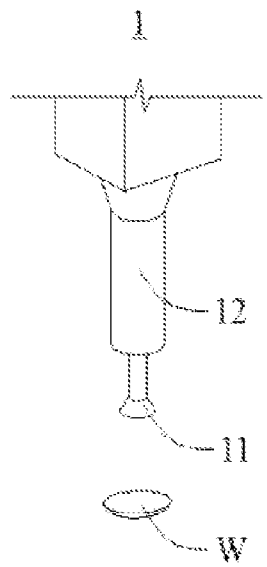
FIG. 1 is a schematic diagram of the working principle of a related lens clamping device.

1—related lens clamping device
11—vacuum suction nozzle
12—bracket
2—base
21—sliding groove
211—groove eave
2111—first groove eave
2112—second groove eave
212—connecting part
2121—guide groove
3—sliding mechanism
31—first sliding block
32—second sliding block
33—first protrusion
34—second protrusion
35—first limit member
36—second limit member
4—transmission mechanism
41—first clamping member
42—second clamping member
43—first moving member
431—first connecting rod
44—second moving member
441—second connecting rod
45—first return member
46—second return member ID
5—suction nozzle
6—elastic element
7—locking rod
8—driving device
81—first driving device
811—first driving rod
812—first driving source
82—second driving device
821—second driving rod
822—second driving source
W—lens
O'—symmetrical centerline of the sliding mechanism

DETAILED DESCRIPTION

In order to make the objectives, technical solutions and advantages of the present disclosure clearer, the following would further describe the present disclosure in detail in combination with the drawings and embodiments. It should be understood that the specific embodiments described herein are merely used to explain, not to limit, the present disclosure.

Each specific technical feature described in the specific embodiments, may be combined in any suitable way without contradiction; for example, different embodiments and technical solutions may be formed by the combination of different specific technical features. In order to prevent unnecessary repetition, the various possible combinations of each specific technical feature in the present disclosure will not be described separately.

In the following description, the terms "first\second" merely distinguish different objects and do not indicate similarities or relevancy between the both. The term "connection", in a case where it is not specifically described, includes both direct connection and indirect connection. The term "first direction" indicates the length extension direction of a sliding mechanism.

It should be noted that the terms "including", "comprising" or any other variation thereof are intended to cover non-exclusive inclusions, such that a process, method, article, or apparatus comprising a series of elements not only include those elements, but also include other elements that are not explicitly listed, or also include elements inherent to such process, method, article or apparatus. In a case of not having further limitations, an element defined by the statement "including . . . " does not exclude another identical element in a process, method, article or apparatus that includes that element.

A lens clamping device provided in embodiments of the present disclosure may be used for picking up a lens. The type of the lens is not limited. The clamping device can be applied to a tooling clamp of a factory production workshop. It should be noted that the type of the application scene of the present disclosure does not limit the lens clamping device of the present disclosure.

The working principle of the related lens clamping device 1 is exemplarily described below in combination with FIG. 1. The lens clamping device may comprise a vacuum suction nozzle 11 and a bracket 12 fixedly connected with one end of the vacuum suction nozzle 11. The bracket 12 may move horizontally or vertically in a pickup area under the control of a guide structure and drive the vacuum suction nozzle 11 to move therewith. The vacuum suction nozzle 11 comes close to the lens W until one end of the vacuum suction nozzle 11 far away from the bracket 12 brings in contact with the surface of the lens W, and the vacuum suction nozzle 11 picks up the lens W by means of vacuum adsorption, so that the lens W does not fall, and the process of lens clamping device picking up the lens W is implemented.

Figure 2A:
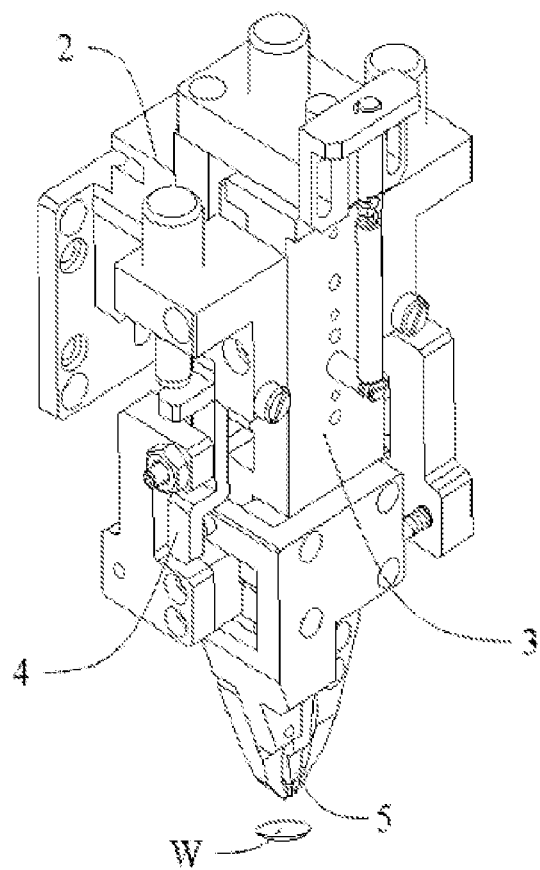
FIG. 2a is a three-dimensional structural schematic diagram of a lens clamping device according to an embodiment of the present disclosure under a perspective.
Figure 2B:
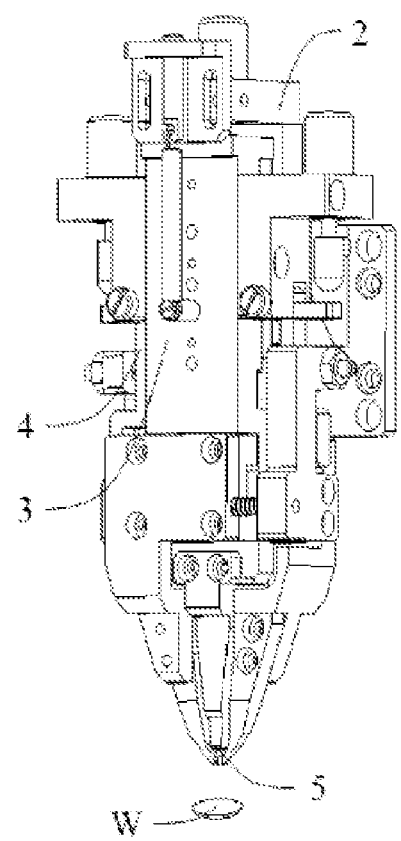
FIG. 2b is a three-dimensional structural schematic diagram of a lens clamping device according to an embodiment of the present disclosure under another perspective.

In the embodiments of the present disclosure, as shown in FIG. 2a and FIG. 2b, the lens clamping device comprises a base 2, a sliding mechanism 3, a transmission mechanism 4 and a suction nozzle 5. The base 2 is fixed. The sliding mechanism 3 is slidably connected with the base 2, and is movable relative to the base 2 along a first direction. Specifically, the first direction refers to the length extension direction of the sliding mechanism 3 (the vertical direction as shown in FIG. 2a and FIG. 2b), and the sliding mechanism 3 is slidable relative to the base 2 within a certain range along the first direction.

Figure 3:
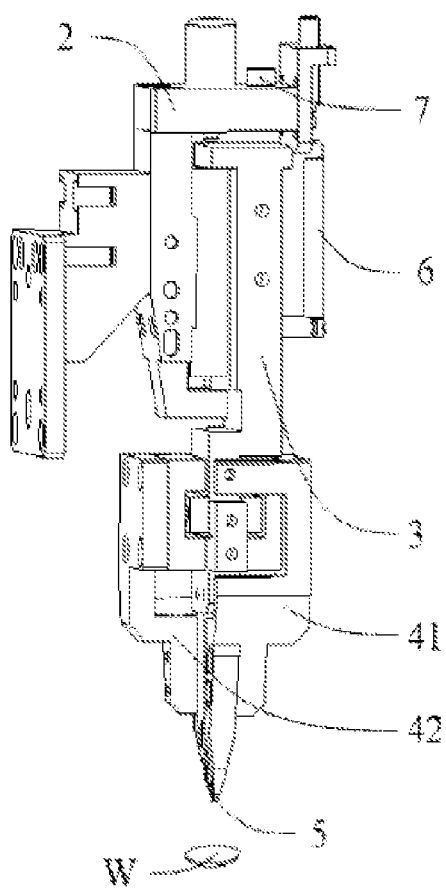
FIG. 3 is a partial structural schematic diagram of a lens clamping device according to an embodiment of the present disclosure.
Figure 4A:
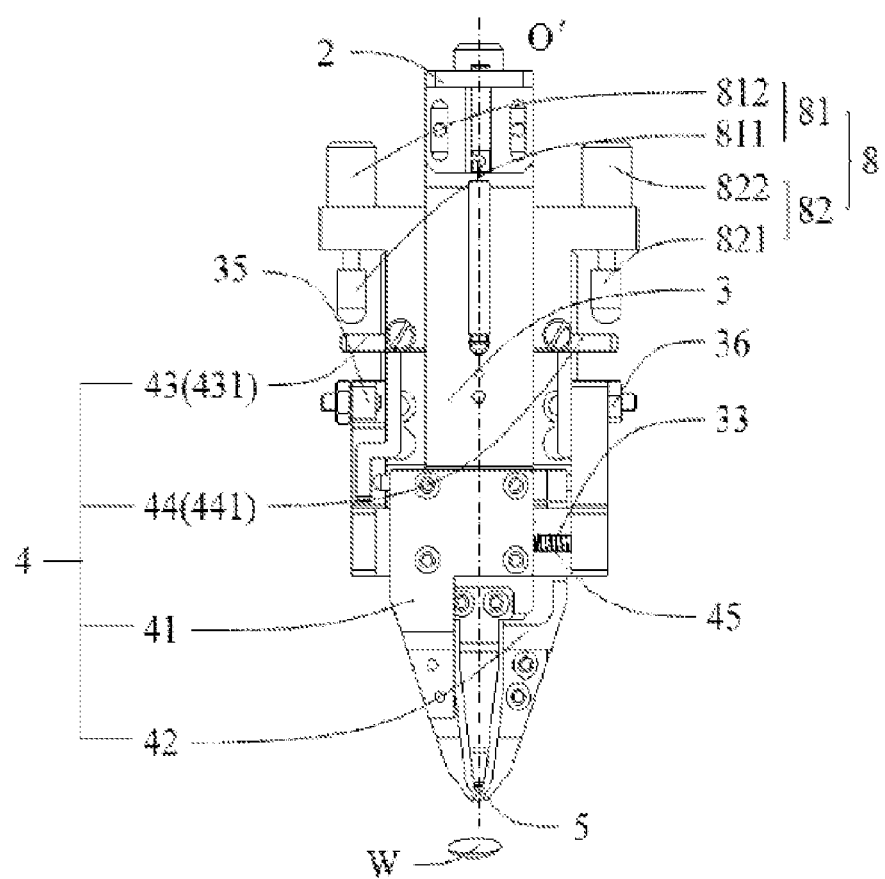
FIG. 4a is a front structural view of a lens clamping device according to an embodiment of the present disclosure.

As shown in FIG. 3 and FIG. 4a, the transmission mechanism 4 is connected with the sliding mechanism 3. Specifically, the transmission mechanism 4 is movable relative to the base 2 along the first direction along with the movement of the sliding mechanism 3. The transmission mechanism 4 includes a first clamping member 41 and a second clamping member 42. The first clamping member 41 and the second clamping member 42 are movable relatively far away from and close to each other along the second direction, wherein the second direction is perpendicular to the first direction. Specifically, the second direction is the horizontal direction shown in FIG. 4a. The structure of the first clamping member 41 and the second clamping member 42 includes a main body and a clamping jaw, and the main body and the clamping jaw may be integrally formed. The body may be an approximately rectangular body, and a portion of one end of the main body extending far away from the base 2 is a clamping jaw. The first clamping member 41 and the second clamping member 42 are provided oppositely; that is, the first clamping member 41 is slidably connected with one side of the sliding mechanism 3 (the right hand as shown in FIG. 3), and the second clamping member 42 is slidably connected with the opposite other side of the sliding mechanism 3 (the left side as shown in FIG. 3). The first clamping member 41 and the second clamping member 42 are slidable within a certain range along the second direction, and the sliding directions of the both are opposite; that is, the first clamping member 41 and the second clamping member 42 move away from each other and close to each other along the second direction, i.e. the above-mentioned relatively far away from and close to each other. The first clamping member 41 and the second clamping member 42 move relatively close to each other, so that the two clamping jaws are capable of bringing in contact with the lens W and clamping the lens W, and the lens W may prevent the lens W from falling off through the friction force between the lens W and the clamping jaw. The first clamping member 41 and the second clamping member 42 move relatively far away from each other; that is, the lens W can be released. The tail ends of the clamping jaws of the first clamping member 41 and the second clamping member 42 are approximately at the same height, which may effectively reduce the deflection of the clamping force generated when the lens W is clamped due to the position deviation of the first clamping member 41 and the second clamping member 42, so as to reduce the risk that the lens W falls off.

As shown in FIG. 4a, the suction nozzle 5 is fixedly connected to one end of the sliding mechanism 3 along the first direction and is used for sucking the lens W. Specifically, the suction nozzle 5 may be a vacuum suction nozzle, The suction nozzle 5 may reciprocate relative to the base 2 along the first direction under the driving of the sliding mechanism 3, and the suction nozzle 5 moves in a direction approaching the lens W along the first direction until the tail end of the suction nozzle 5 brings in contact with the lens W, and then adsorbs the lens W through the vacuum adsorption force, so that the lens W does not fall off. That is to say, the adsorption force may limit the movement of the lens W relative to the suction nozzle 5 in the first direction.

As shown in FIG. 4a, the suction nozzle 5 is located between the first clamping member 41 and the second clamping member 42. Specifically, the first clamping member 41 and the second clamping member 42 are symmetrically provided relative to the suction nozzle 5. The clamping jaw of the first clamping member 41 is provided on one side of the suction nozzle 5 along the second direction, and the clamping jaw of the second clamping member 42 is provided on an opposite side of the suction nozzle 5 along the second direction. The first clamping member 41 and the second clamping member 42 becomes relatively close to each other so as to limit the displacement of the lens W in the second direction. Specifically, the suction nozzle 5 sucks the lens W, and the first clamping member 41 and the second clamping member 42 gradually close to each other relative to the lens W from both sides of the suction nozzle 5, until the clamping jaws of the first clamping member 41 and the second clamping member 42 bring in contact with the lens W. The height of the tail ends of the clamping jaws of the first clamping member 41 and the second clamping member 42 from a surface of a pickup platform is not greater than the height of the tail end of the suction nozzle 5 from the surface of the pickup platform. As a result, after the suction nozzle 5 sucks the lens W, the clamping jaws of the first clamping member 41 and the second clamping member 42 are capable of bringing in contact with the lens W in the process that the first clamping member 41 and the second clamping member 42 move close to each other along the second direction, and thus, the lens W is clamped. In contrast, the first clamping member 41 and the second clamping member 42 move gradually far away from the lens W from both sides of the suction nozzle 5, so that the clamped lens W may be released.

The adsorption effect of the suction nozzle 5 limits the movement of the lens W relative to the suction nozzle 5 in the first direction, and the clamping action of the first clamping member 41 and the second clamping member 42 limits the movement of the lens W in the second direction relative to the first clamping member 41 and the second clamping member 42. The lens W is acted by the adsorption force along the first direction and is acted by the relative clamping force along the second direction. In this way, through external forces in three directions, the lens W is fixed relative to the whole lens clamping device. The reliability and stability of clamping the lens W is effectively improved. Since the lens W is first limited from moving in the first direction, when the first clamping member 41 and the second clamping member 42 limit the lens W in the second direction, the requirement for the structure and the machining precision on the first clamping member 41 and the second clamping member 42 may be properly reduced to auxiliary clamp the lens W sucked by the suction nozzle 5.

In the embodiments of the present disclosure, the lens clamping device is provided with the first clamping member and the second clamping member, between of which the suction nozzle is provided, and the lens is limited to move relative to the suction nozzle in the first direction by suction of the suction nozzle, and is limited to move relative to the first and second clamping members in the second direction by clamping of the first and second clamping members. In this way, the reliability of picking up the lens by the lens clamping device is effectively improved by means of limits in two directions, so as to reduce the deviation of the lens produced during the continuous high-speed action along with the lens clamping device.

Figure 4B:
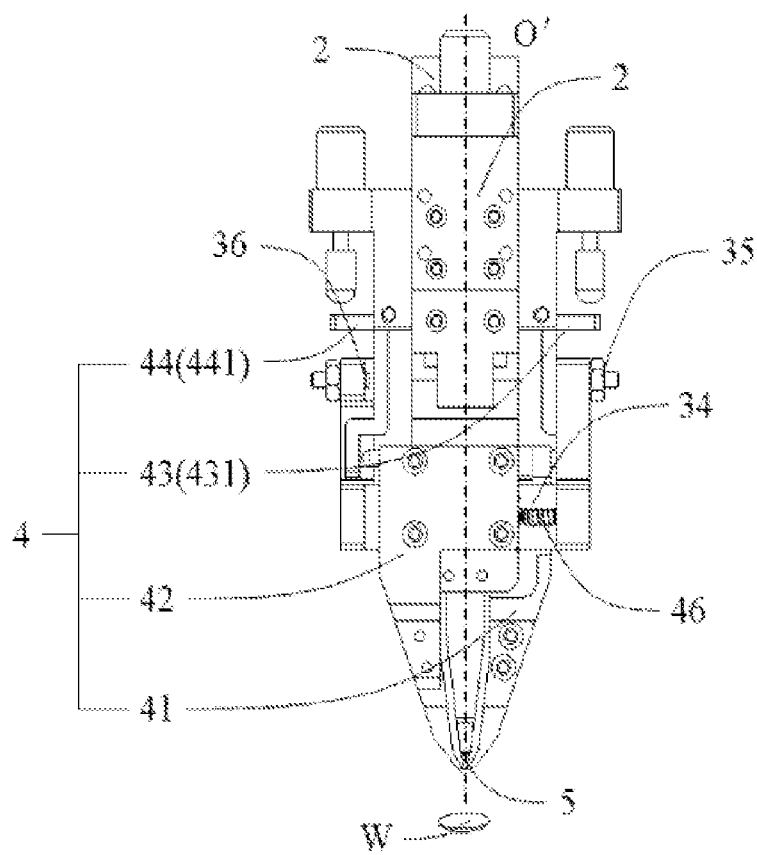
FIG. 4b is a rear structural view of a lens clamping device according to an embodiment of the present disclosure.

In some embodiments, as shown in FIG. 4a and FIG. 4b, the transmission mechanism 4 further includes a first moving member 43 and a second moving member 44. Specifically, the first moving member 43 and the second moving member 44 are approximately the same in appearance and structure. The first moving member 43 and the second moving member 44 are symmetrically provided relative to a symmetric centerline O' of the sliding mechanism 3, and are respectively provided on both sides of the sliding mechanism 3 along the second direction. As shown in FIG. 4a, it is a front view of the lens clamping device. The first moving member 43 is connected with the sliding mechanism 3 and is located on one side of the sliding mechanism 3 along the second direction. The first moving member 43 is movable relative to the sliding mechanism 3, and is adjacent to one end of the first clamping member 41. Specifically, in the process that the first moving member 43 moves relative to the sliding mechanism 3, the first moving member 43 may bring in contact with the adjacent first clamping member 41, and bring along the first clamping member 41 to move in a direction approaching the suction nozzle 5 along the second direction. As shown in FIG. 4b, it is a structural rear view of a lens clamping device.

The second moving member 44 is connected with the sliding mechanism 3 and is located on the other side of the sliding mechanism 3 along the second direction opposite to the one side. The second moving member 44 is movable relative to the sliding mechanism 3, and the second moving member 44 is adjacent to one end of the second clamping member 42. Specifically, in the process that the second moving member 44 moves relative to the sliding mechanism 3, the second moving member 44 may bring in contact with the adjacent second clamping member 42, and bring along the second clamping member 42 to move in the direction approaching the suction nozzle 5 along the second direction.

As shown in FIG. 4a and FIG. 4b, the first moving member 43 and the second moving member 44 move along opposite directions at the same rate to push the first clamping member 41 and the second clamping member 42 to be close to each other. Specifically, the first moving member 43 and the second moving member 44 which are moving at the same rate in the opposite directions are capable of driving the first clamping member 41 and the second clamping member 42 in contact with them to also move at the same rate and in the opposite directions therewith, i.e. to realize the synchronous movements of the first clamping member 41 and the second clamping member 42. The first clamping member 41 and the second clamping member 42 may simultaneously bring in contact with the lens W in the process of clamping the lens W. The situation that the lens W having been solidified by the glue deviates due to uneven forces on both sides of the lens W caused by the first clamping member 41 and the second clamping member 42 at the moment of contacting with the lens W, can be effectively reduced, thereby improving the yield of the lens.

As shown in FIG. 4a and FIG. 4b, the transmission mechanism 4 further includes a first return member 45 and a second return member 46. Specifically, the first return member 45 and the second return member 46 are both elastic elements, which can deform under the effect of external force in an allowable range of elasticity, and generate a counteracting force opposite to the effect of external force to make it return to an initial state. As shown in FIG. 4a, the first return member 45 is provided between the other end of the first clamping member 41 and the sliding mechanism 3. Specifically, one end of the first return member 45 is in contact with the sliding mechanism 3, and the opposite other end of the first return member 45 is in contact with the first clamping member 41. The first clamping member 41 drives the first return member 45 to move therewith in the process that the first clamping member 41 moves in the direction approaching the suction nozzle 5, and makes the first return member 45 be gradually compressed. As shown in FIG. 4b, the second return member 46 is provided at intervals with the first return member 45 along the second direction, and is located between the other end of the second clamping member 42 and the sliding mechanism 3. Specifically, one end of the second return member 46 is in contact with the sliding mechanism 3, and the opposite end of the second return member 46 is in contact with the second clamping member 42. The second clamping member 42 drives the second return member 46 to move therewith in the process that the second clamping member 42 moves in the direction approaching the suction nozzle 5, and makes the second restoring piece 46 be gradually compressed.

As shown in FIG. 4a and FIG. 4b, the first return member 45 and the second return member 46 are capable of generating a return force that makes the first clamping member 41 and the second clamping member 42 be relatively far away from each other along with the closing to each other between the first clamping member 41 and the second clamping member 42. Specifically, the first return member 45 and the second return member 46 are deformed due to being compressed, thereby generating an elastic force, i.e., the return force. Since the movement directions of the first clamping member 41 and the second clamping member 42 are opposite, the directions of the return forces generated by the first return member 45 and the second return member 46 are opposite, and the directions of the return forces are the second direction. The return forces correspondingly act on the first clamping member 41 and the second clamping member 42, so that the first clamping member 41 and the second clamping member 42 may move far away from each other, so as to realize the release of the lens W. The elasticity coefficients and structures of the first return member 45 and the second member 46 are approximately the same, thus the first clamping member 41 and the second clamping member 42 may be respectively subjected to return forces with the same amount from the first return member 45 and the second return member 46, thereby, realizing the synchronous movement of the first clamping member 41 and the second clamping member 42. The first clamping member 41 and the second clamping member 42 may simultaneously detach from the lens W in the process of releasing the lens W. The situation that the lens W having been solidified by the glue deviates due to uneven forces on both sides of the lens W caused by the first clamping member 41 and the second clamping member 42 at the moment detaching from the lens W, is effectively reduced, thereby improving the yield of the lens.

In an exemplary embodiment, as shown in FIG. 4a and FIG. 4b, both the first return member 45 and the second return member 46 are compression springs. The other end of the sliding mechanism 3 close to the first clamping member 41 is provided with a first protrusion 33, and the other end of the sliding mechanism 3 close to the second clamping member 42 is provided with a second protrusion 34. The first return member 45 is sleeved on the first protrusion 33, and the second return member 46 is sleeved on the second protrusion 34. Specifically, the first protrusion 33 and the second protrusion 34 may be approximately cylindrical and have approximately the same structural sizes, and the extension direction of the length is the second direction. The length of the first protrusion 33 and the length of the second protrusion 34 are respectively less than the length of the first return member 45 and the length of the second return member 46 in an extreme compression state, so as to prevent the first clamping member 41 and the second clamping member 42 from contacting with the first protrusion 33 and the second protrusion 34 in the extreme compression state, thereby damaging the components. The outer diameter of the first protrusion 33 and the outer diameter of the second protrusion 34 are respectively slightly smaller than the inner diameter of the first return member 45 and the inner diameter of the second return member 46, so that the first return member 45 and the second return member 46 may be sleeved on the first protrusion 33 and the second protrusion 34, respectively, and the movement of the first return member 45 and the second return member 46 in a radial direction may be limited.

As shown in FIG. 4a and FIG. 4b, the first return member 45 and the second return member 46 are always in a compressed state. Specifically, the first clamping member 41 and the second clamping member 42 released the lens W or in a non-clamping state may slide back and forth under a condition of no external force, touching the suction nozzle 5 and causing damage to the suction nozzle 5. The return forces generated by the first return member 45 and the second return member 46 which have been in a compressed state can constrain the movement of the first clamping member 41 and the second clamping member 42.

By providing the first moving member and the second moving member with the same movement rate and the opposite movement directions, the stage-by-stage transmission of power is effectively realized, and the first clamping member and the second clamping member may be synchronously close to the lens, thereby completing the clamping for the lens; and by providing the first return member and the second return member, the transmission mode of the return member is convenient, and the first clamping member and the second clamping member can move synchronously far away from the lens, thereby completing the release for the lens. The transmission mechanism not only effectively enhances the reliability of lens pickup, but also improves the yield of the lens.

Figure 5A:
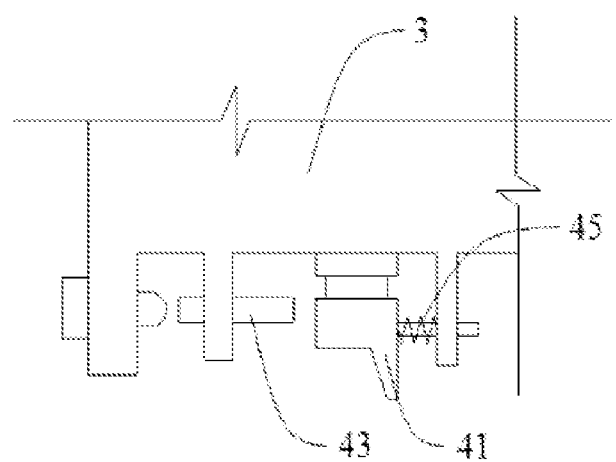
FIG. 5a is a partial structural schematic diagram of a transmission mechanism of another lens clamping device.
Figure 5B:
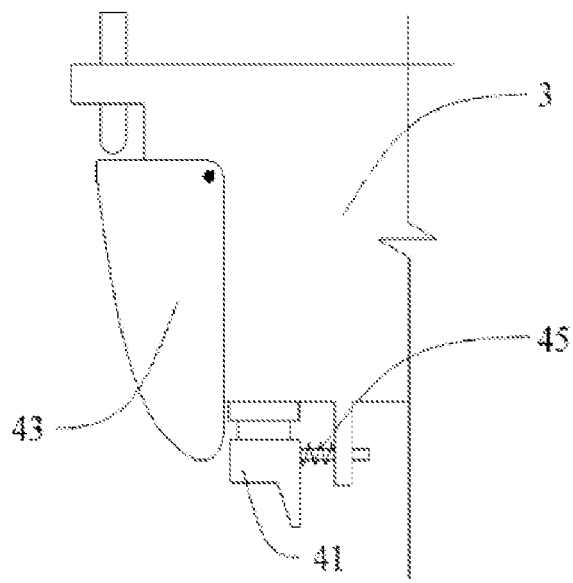
FIG. 5b is a partial structural schematic diagram of a transmission mechanism of another lens clamping device.

In other embodiments, the transmission mechanism 4 may have other arrangement modes. As shown in FIG. 5a, the first moving member 43 may move relative to the sliding mechanism 3 in the second direction, so as to push the first clamping member 41 to move in the second direction, and to make the first return member 45 to generate a return force opposite to the movement of the first clamping member 41. Similarly, the movement principle of the second moving member 44 is the same as that of the first moving member 43, and its details are not described herein again. As shown in FIG. 5b, the first moving member 43 may rotate relative to the sliding mechanism 3, so as to push the first clamping member 41 to move in the second direction, and to make the first return member 45 to generate a return force opposite to the movement of the first clamping member 41.

In some embodiments, as shown in FIG. 4a and FIG. 4b, the first moving member 43 is a first connecting rod 431 rotatably connected with the sliding mechanism 3, and the second moving member 44 is a second connecting rod 441 rotatably connected to the sliding mechanism 3. Specifically, the first connecting rod 431 and the second connecting rod 441 may be approximately L-shaped connecting rods, and the corners of the connecting rods are rotatably connected with the sliding mechanism 3. The first connecting rod 431 and the second connecting rod 441 rotate in opposite directions around connecting points, and the tail ends of the first connecting rod 431 and the second connecting rod 441 push the first clamping member 41 and the second clamping member 42 to approach each other along the second direction. The provision of the first moving member and the second moving member as the connecting rods, not only can effective transmission be realized, but also enable the structures thereof to be compact, lightweight, and easy to install and detach.

In some embodiments, as shown in FIG. 3, the lens clamping device further comprises an elastic element 6 provided between the base 2 and the other end, opposite to said one end, of the sliding mechanism 3, and the elastic element 6 is connected with both the base 2 and the sliding mechanism 3. Specifically, the elastic element 6 may be a tension spring or a compression spring. In an exemplary embodiment, the elastic element 6 is a tension spring, and the elastic element 6 is provided along the first direction. One end of the elastic element 6 is connected with the base 2, and the opposite end of the elastic element 6 is connected with the sliding mechanism 3. The sliding mechanism 3 is elastically connected to the base 2 by means of the elastic element 6, and the gravity of the sliding mechanism 3 keeps balance with the tension generated by the tension spring. By providing the elastic element 6, the lens clamping device can reduce the impact and damage to the lens W in an elastic buffering mode at the moment when the lens clamping device brings in contact with the lens W.

In some embodiments, as shown in FIG. 3, the lens clamping device further comprises a locking rod 7 which is connected with the base 2 and is located at the other end of the sliding mechanism 3. The locking rod 7 may move in the direction approaching the suction nozzle 5 along the first direction so as to limit the movement of the sliding mechanism 3 relative to the base. Specifically, the locking rod 7 may be an approximately cylindrical shaft. The locking rod 7 is slidably connected with the base 2, and may reciprocate relative to the base 2 along the first direction. When the sliding mechanism 3 and the base 2 are in an elastic connection state, the locking rod 7 moves in the direction approaching the suction nozzle 5 along the first direction, and a tail end of the locking rod 7 may close to the sliding mechanism 3 and continue to push the sliding mechanism 3 to move within a certain range in the first direction until the sliding mechanism 3 is static relative to the base 2; at this time, the sliding mechanism 3 and the base 2 are switched from an elastic connection to a rigid connection. Thus, in the process of rapid continuous operation, the sliding mechanism 3 drives the suction nozzle 5 to suck the lens W without reciprocating back and forth in the first direction, so that the lens W can be sucked more accurately and quickly.

Figure 6A:
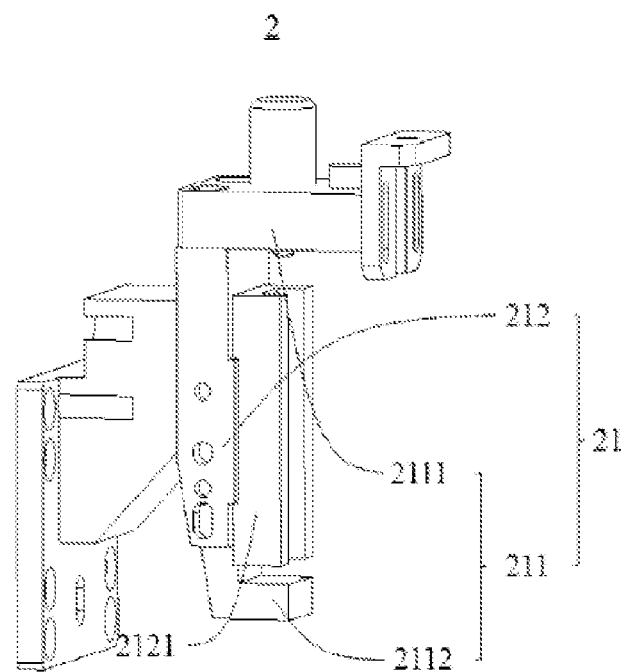
FIG. 6a is a three-dimensional structural schematic diagram of a base of a lens clamping device according to an embodiment of the present disclosure.
Figure 6B:
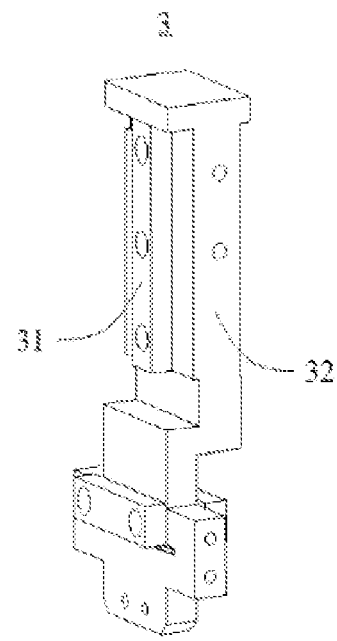
FIG. 6b is a three-dimensional structural schematic diagram of a sliding mechanism of a lens clamping device according to an embodiment of the present disclosure.

In some embodiments, as shown in FIG. 6a and FIG. 6b, the base 2 is provided with a sliding groove 21 extending along the first direction. As shown in FIG. 6a, the sliding groove 21 has two groove eaves 211 oppositely provided along the first direction, i.e., the first groove eave 2111 and the second groove eave 2112. The sliding groove 21 further has a connecting part 212 for connecting the two groove eaves 211, and the connecting part 212 is provided with a guide groove 2121 along the first direction. As shown in FIG. 6b, the sliding mechanism 3 includes a first sliding block 31 and a second sliding block 32 fixedly connected with the first sliding block, and the first sliding block 31 may slide along the sliding groove 21 in the first direction. Specifically, the width sizes of the first sliding block 31 and the guide groove 2121 are matched. It should be noted that the width refers to a distance between end faces of the component along the second direction. The first sliding block 31 is slidable in the guide groove 2121, driving the second sliding block 32 fixedly connected with the first sliding block 31 to move relative to the base 2 along the first direction.

Figure 6C:
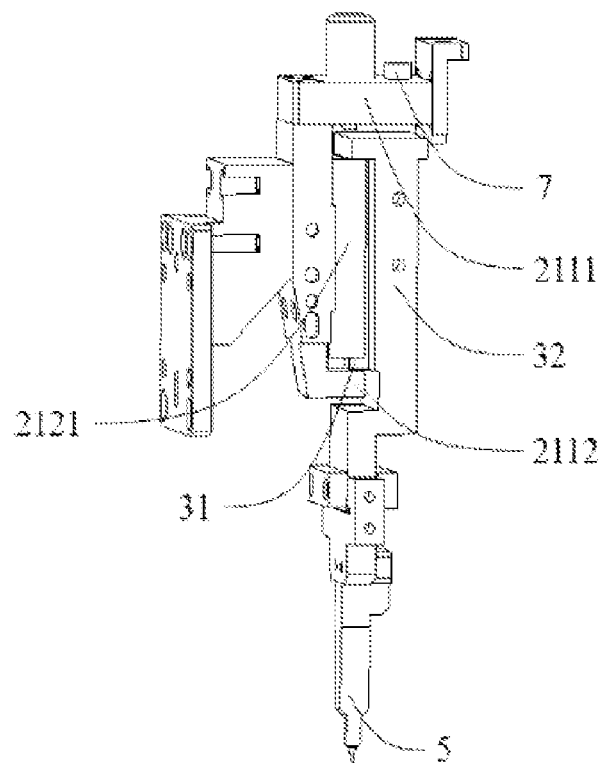
FIG. 6c is an assembly structure schematic diagram of a base and a sliding mechanism of a lens clamping device according to an embodiment of the present disclosure.

As shown in FIG. 6c, the locking rod 7 is connected with one end of the sliding groove 21 far away from the suction nozzle 5. The locking rod 7 may move in the direction approaching the suction nozzle 5 along the first direction, and bring in contact with one end of the second sliding block 32, and then push the second sliding block 32 to move in the direction approaching the suction nozzle 5 along the first direction, so that one end of the first sliding block 31 far away from the locking rod 7 abuts against one end of the sliding groove 21 close to the suction nozzle 5. Specifically, the locking rod 7 is provided in the first groove eave 2111 of the sliding groove 21 and is slidably connected with the first groove eave 2111. The locking rod 7 moves in the direction approaching the suction nozzle 5 along the first direction until it brings in contact with the end face of the second sliding block 32 close to the locking rod 7, and the locking rod 7 continues to move in the original direction to push the second sliding block 32 to move, then the second sliding block 32 drives the first sliding block 31 fixedly connected therewith to move along the guide groove 2121, so that the end face of one end of the first sliding block 31 close to the suction nozzle 5 abuts against the end wall surface of the second groove eave 2112. It should be noted that abutting refers to tight contact, thereby limiting the relative movement of two abutting objects in a certain direction. Such abutting mode limits the movements of the sliding mechanism 3 and the base 2, thus realizing the rigid connection between the sliding mechanism 3 and the base 2.

The provision of the sliding groove on the base and the division of the sliding mechanism into two sliding blocks, not only can realize the sliding of the sliding mechanism relative to the base, but also can switch the connection state of the sliding mechanism relative to the base from the elastic connection to the rigid connection, which is an ingenious structural design and a simple structure arrangement mode, and which has good adaptability.

In some embodiments, as shown in FIG. 4a and FIG. 4b, the sliding mechanism 3 further includes a first limit member 35 and a second limit member 36. The first limit member 35 and the second limit member 36 are both fixedly connected with the second sliding block 32, and are respectively located on one side of the first moving member 43 and the second moving member 44 far away from the second sliding block 32, so as to limit the movements of the first moving member 43 and the second moving member 44. Specifically, the first limit member 35 and the second limit member 36 are symmetrically provided with respect to the symmetric centerline O', as shown in FIG. 4a, and when the first moving member 43 rotates in the clockwise direction, the first position limitation member 35 may limit the continuous rotation of the first moving member 43, so as to prevent the first moving member 43 from touching other components of the lens clamping device, and the second position limitation member 36 is similar to the first position limitation member 35. The first limit member 35 and the second limit member 36 may be elastic materials with certain damping, so that the first moving member 43 and the second moving member 44 play a buffering effect when bringing in contact with the first limit member 35 and the second limit member 36, so as to protect the first moving member 43 and the second moving member 44 from damage. Meanwhile, as shown in FIG. 4a, by taking the first clamping member 41 as an example, when the first clamping member 41 slides along the second direction to exceed the stroke of the left side, the left end of the first clamping member 41 will touch the first moving member 43, so that the first moving member 43 rotates in the clockwise direction, however, the blocking of the first limit member 35 to the first moving member 43 makes the first moving member 43 unable to rotate in a wide range, limiting the sliding stroke of the first clamping member 41 from beyond the range. Similarly, the second limit member 36 may also limit the sliding stroke of the second clamping member 42 from beyond the range.

The provision of the limit members on the sliding mechanism, can limit the movement of the moving member in a non-transmission state, meanwhile, also provide the moving member with a buffering effect so as to be protected from impact and damage, and limit the clamping member from sliding beyond the range.

In some embodiments, as shown in FIG. 4a, the lens clamping device further comprises a driving device 8. The driving device 8 includes a first driving device 81 adjacent to the first connecting rod 431 to drive the first connecting rod 431 to rotate, and further includes a second driving device 82 adjacent to the second connecting rod 441 to drive the second connecting rod 441 to rotate. Specifically, the first driving device 81 and the second driving device 82 provide driving forces for the first connecting rod 431 and the second connecting rod 441, so that the first connecting rod 431 and the second connecting rod 441 may rotate relative to the sliding mechanism 3. The first driving device 81 and the second driving device 82 are the power source for realizing a multi-stage transmission of the transmission mechanism 4. By providing the driving device in the lens clamping device, the stage-by-stage transmission of power enables the clamping member to slide relative to the sliding mechanism and clamp the lens.

In some embodiments, as shown in FIG. 4a, the first driving device 81 includes a first driving rod 811 adjacent to one end of the first connecting rod 431. The first driving rod 811 may move in a direction close to the first connecting rod 431 along the first direction to push the first connecting rod 431 to rotate, and move in a direction far away from the first connecting rod 431 along the first direction to detach from the first connecting rod 431. The second driving device 82 includes a second driving rod 821 adjacent to one end of the second connecting rod 441. The second driving rod 821 may move in a direction close to the second connecting rod 441 along the first direction to push the second connecting rod 441 to rotate, and move in a direction far away from the second connecting rod 441 along the first direction to detach from the second connecting rod 441. A driving source is connected with the first driving rod 811 and the second driving rod 821 to drive the first driving rod 811 and the second driving rod 821 to reciprocate along the first direction. Specifically, the driving source provides a driving force for the driving rod, so that the driving rod does a linear reciprocating movement. The driving source may be one which controls both the first driving rod 811 and the second driving rod 821, or the driving source may be two, i.e., the first driving source 812 and the second driving source 822, which independently control the movements of the first driving rod 811 and the second driving rod 821, respectively. The driving source may be a cylinder which is connected with an air inlet to provide aerodynamic force, and the driving force provided by an aerodynamic mode of driving source is strong. Optionally, the drive source may also be in a form of crankshaft and connecting rod. The crankshaft is connected with a motor rotor, and the motor drives the crankshaft to rotate, and then the connecting rod drives the driving rod to perform linear reciprocating movement.

By providing the driving device to be in the form of a driving rod and a cylinder, the structure is simple, and the occupied space is small, which is stable and reliable.

The above are merely preferred embodiments of the present disclosure and are not intended to limit the protection scope of the present disclosure.

What is claimed is:

1. A lens clamping device for picking up a lens, comprising:
a base;
a sliding mechanism, which is slidably connected with the base, and is movable along a first direction relative to the base;
a transmission mechanism, which is connected with the sliding mechanism, and includes a first clamping member and a second clamping member capable of being relatively far away from and close to each other along a second direction, wherein the second direction is perpendicular to the first direction; and
a suction nozzle, which is fixedly connected to one end of the sliding mechanism along the first direction and is used for sucking the lens;
wherein the suction nozzle is located between the first clamping member and the second clamping member, and the first clamping member and the second clamping member are relatively close to each other so as to limit a displacement of the lens in the second direction, and
wherein the transmission mechanism further comprises:
a first moving member, which is connected with the sliding mechanism and is located on one side of the sliding mechanism along the second direction, wherein the first moving member is movable relative to the sliding mechanism and is adjacent to one end of the first clamping member;
a second moving member, which is connected with the sliding mechanism and is located on the other side of the sliding mechanism along the second direction opposite to the one side, wherein the second moving member is movable relative to the sliding mechanism, and is adjacent to one end of the second clamping member;
a first return member, which is provided between the other end of the first clamping member and the sliding mechanism;
a second return member, which is provided at intervals with the first return member along the second direction, and is located between the other end of the second clamping member and the sliding mechanism;
wherein the first moving member and the second moving member move along opposite directions at the same rate to push the first clamping member and the second clamping member to approach each other; and the first return member and the second return member generate a return force that makes the first clamping member and the second clamping member be relatively far away from each other with the approaching each other of the first clamping member and the second clamping member.

2. The lens clamping device of claim 1, wherein the first moving member is a first connecting rod rotatably connected with the sliding mechanism, and the second moving member is a second connecting rod rotatably connected with the sliding mechanism.

3. The lens clamping device of claim 2, wherein the lens clamping device further comprises a driving device,
wherein the driving device includes a first driving device provided adjacent to the first connecting rod to drive the first connecting rod to rotate, and further includes a second driving device adjacent to the second connecting rod to drive the second connecting rod to rotate.

4. The lens clamping device of claim 3, wherein the first driving device comprises a first driving rod adjacent to one end of the first connecting rod, wherein the first driving rod is movable in a direction approaching the first connecting rod along the first direction to push the first connecting rod to rotate, and is movable in a direction far away from the first connecting rod along the first direction to detach from the first connecting rod;

the second driving device comprises a second driving rod adjacent to one end of the second connecting rod, wherein the second driving rod is movable in a direction close to the second connecting rod along the first direction to push the second connecting rod to rotate, and is movable in a direction far away from the second connecting rod along the direction to detach from the second connecting rod; and a driving source, which is connected with the first driving rod and the second driving rod to drive the first driving rod and the second driving rod to reciprocate along the first direction.

5. The lens clamping device of claim 1, wherein the lens clamping device further comprises an elastic element, which is provided between the base and the other end of the sliding mechanism opposite to the one end, and is connected with both the base and the sliding mechanism.

6. The lens clamping device of claim 5, wherein the lens clamping device further comprises a locking rod connected with the base and located at the other end of the sliding mechanism, wherein the locking rod is movable in a direction approaching the suction nozzle along the first direction, so as to limit a movement of the sliding mechanism relative to the base.

7. The lens clamping device of claim 1, wherein both the first return member and the second return member are compression springs, one end of the sliding mechanism close to the first clamping member is provided with a first protrusion, and the other end of the sliding mechanism close to the second clamping member is provided with a second protrusion, wherein the first return member is sleeved on the first protrusion, and the second return member is sleeved on the second protrusion; wherein the first return member and the second return member are always in a compressed state.

8. The lens clamping device of claim 1, wherein the suction nozzle is located between the first clamping member and the second clamping member, both of which are capable of being relatively close to each other to clamp the lens, and being relatively far away from each other to release the lens.

9. A lens clamping device for picking up a lens, comprising:
   a base;
   a sliding mechanism, which is slidably connected with the base, and is movable along a first direction relative to the base;
   a transmission mechanism, which is connected with the sliding mechanism, and includes a first clamping member and a second clamping member capable of being relatively far away from and close to each other along a second direction, wherein the second direction is perpendicular to the first direction;
   a suction nozzle, which is fixedly connected to one end of the sliding mechanism along the first direction and is used for sucking the lens;
   an elastic element, which is provided between the base and the other end of the sliding mechanism opposite to the one end, and is connected with both the base and the sliding mechanism; and
   a locking rod connected with the base and located at the other end of the sliding mechanism, wherein the locking rod is movable in a direction approaching the suction nozzle along the first direction, so as to limit a movement of the sliding mechanism relative to the base;
   wherein the suction nozzle is located between the first clamping member and the second clamping member, and the first clamping member and the second clamping member are relatively close to each other so as to limit a displacement of the lens in the second direction,
   wherein the base is provided with a sliding groove extending along the first direction, and the sliding mechanism includes a first sliding block and a second sliding block fixedly connected with the first sliding block, the first sliding block being slidable in the first direction along the sliding groove, the locking rod being connected with one end of the sliding groove far away from the suction nozzle, wherein the locking rod is movable in the direction approaching the suction nozzle along the first direction, and brings in contact with one end of the second sliding block, and then pushes the second sliding block to move in the direction approaching the suction nozzle along the first direction, so that one end of the first sliding block far away from the locking rod abuts against one end of the sliding groove close to the suction nozzle.

10. The lens clamping device of claim 9, wherein the sliding mechanism further comprises a first limit member and a second limit member, both of which are fixedly connected with the second sliding block and are respectively located on one side of a first moving member and a second moving member far away from the second sliding block, so as to limit the movement of the first moving member and the second moving member.

11. The lens clamping device of claim 9, wherein the transmission mechanism further comprises:
   a first moving member, which is connected with the sliding mechanism and is located on one side of the sliding mechanism along the second direction, wherein the first moving member is movable relative to the sliding mechanism and is adjacent to one end of the first clamping member;
   a second moving member, which is connected with the sliding mechanism and is located on the other side of the sliding mechanism along the second direction opposite to the one side, wherein the second moving member is movable relative to the sliding mechanism, and is adjacent to one end of the second clamping member;
   a first return member, which is provided between the other end of the first clamping member and the sliding mechanism;
   a second return member, which is provided at intervals with the first return member along the second direction, and is located between the other end of the second clamping member and the sliding mechanism;
   wherein the first moving member and the second moving member move along opposite directions at the same rate to push the first clamping member and the second clamping member to approach each other; and the first return member and the second return member generate a return force that makes the first clamping member and the second clamping member be relatively far away from each other with the approaching each other of the first clamping member and the second clamping member.

* * * * *